(12) United States Patent
Wang et al.

(10) Patent No.: US 12,658,348 B2
(45) Date of Patent: Jun. 16, 2026

(54) SOLENOID POSITION SENSING

(71) Applicant: Rivian IP Holdings, LLC, Irvine, CA
(US)

(72) Inventors: Boru Wang, Pasadena, CA (US);
Yanyan Xie, Rancho Palos Verdes, CA
(US); Silva Hiti, Redondo Beach, CA
(US); Steven Ernest Schulz, Torrance,
CA (US); Chia-Chou Yeh, Torrance,
CA (US); **Khwaja Mustafizur
Rahman**, Troy, MI (US)

(73) Assignee: Rivian IP Holdings, LLC, Irvine, CA
(US)

( * ) Notice: Subject to any disclaimer, the term of this
patent is extended or adjusted under 35
U.S.C. 154(b) by 216 days.

(21) Appl. No.: 18/674,323

(22) Filed: May 24, 2024

(65) Prior Publication Data

US 2025/0364168 A1    Nov. 27, 2025

(51) Int. Cl.
H01F 7/06 (2006.01)
G01D 5/20 (2006.01)
H01F 7/08 (2006.01)
H01F 7/16 (2006.01)

(52) U.S. Cl.
CPC ............. H01F 7/064 (2013.01); G01D 5/202
(2013.01); H01F 7/081 (2013.01); **H01F
7/1607** (2013.01)

(58) Field of Classification Search
CPC ........ H01F 7/064; H01F 7/081; H01F 7/1607;
G01D 5/202
See application file for complete search history.

(56) References Cited

U.S. PATENT DOCUMENTS

| | | | | |
|---|---|---|---|---|
| 6,476,599 B1* | 11/2002 | Czimmek | ................ | F01L 9/20 |
| | | | | 324/207.16 |
| 6,731,126 B2* | 5/2004 | Plummer | ............... | G01R 31/72 |
| | | | | 340/12.32 |
| 2002/0163329 A1* | 11/2002 | D' Alpaos | ................ | F01L 9/20 |
| | | | | 324/207.16 |
| 2003/0107015 A1* | 6/2003 | Mianzo | .................... | F01L 9/20 |
| | | | | 123/90.11 |
| 2015/0167861 A1* | 6/2015 | Ferrer Herrera | ....... | A01G 25/16 |
| | | | | 137/554 |

* cited by examiner

*Primary Examiner* — Scott Bauer
(74) *Attorney, Agent, or Firm* — Patterson + Sheridan,
LLP

(57) ABSTRACT

In certain embodiments, a method of controlling a solenoid
including an armature and a coil includes initiating, by a
control system in electrical communication with the coil,
movement of the armature by applying a first commanded
electrical current to the coil. The method also includes, after
the initiating, generating, by the control system, current
fluctuations to vary a rate of change of current through the
coil. The method also includes estimating, by the control
system, a position of the armature based on the rate of
change of current through the coil.

20 Claims, 5 Drawing Sheets

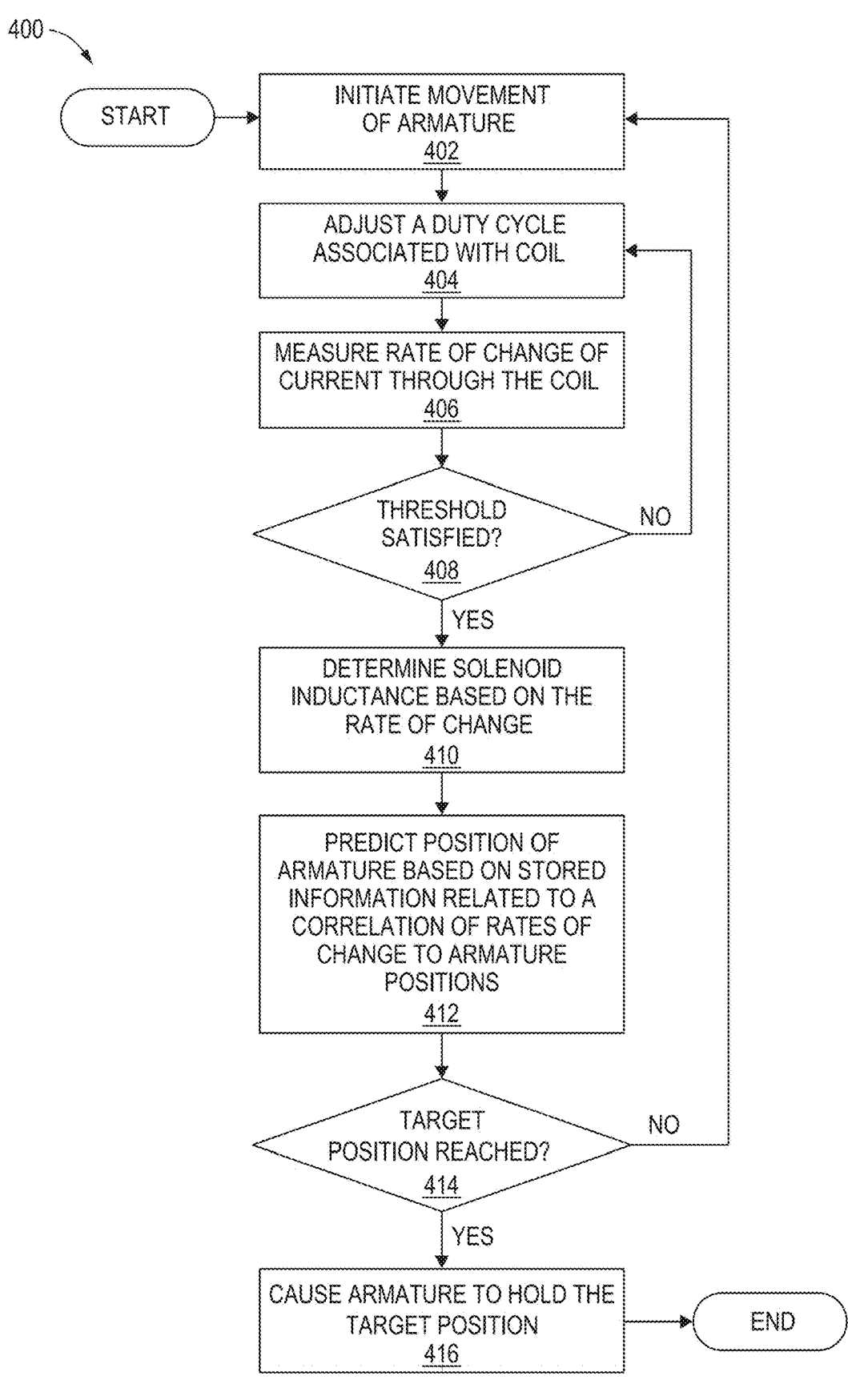

400

START

INITIATE MOVEMENT
OF ARMATURE
402

ADJUST A DUTY CYCLE
ASSOCIATED WITH COIL
404

MEASURE RATE OF CHANGE OF
CURRENT THROUGH THE COIL
406

THRESHOLD
SATISFIED?
408

NO

YES

DETERMINE SOLENOID
INDUCTANCE BASED ON THE
RATE OF CHANGE
410

PREDICT POSITION OF
ARMATURE BASED ON STORED
INFORMATION RELATED TO A
CORRELATION OF RATES OF
CHANGE TO ARMATURE
POSITIONS
412

TARGET
POSITION REACHED?
414

NO

YES

CAUSE ARMATURE TO HOLD THE
TARGET POSITION
416

END

FIG. 4

SOLENOID POSITION SENSING

INTRODUCTION

The present disclosure relates to position sensing, and more particularly, but not by way of limitation, to determining a position of a solenoid armature.

SUMMARY

In certain embodiments, one general aspect includes a method of controlling a solenoid including an armature and a coil. The method includes initiating, by a control system in electrical communication with the coil, movement of the armature by applying a first commanded electrical current to the coil. The method also includes, after the initiating, generating, by the control system, current fluctuations to vary a rate of change of current through the coil. The method also includes estimating, by the control system, a position of the armature based on the rate of change of current through the coil.

In certain embodiments, another general aspect includes an actuation system. The actuation system includes a solenoid including an armature and a coil and a control system in electrical communication with the coil. The control system is operable to initiate movement of the armature by applying a first commanded electrical current to the coil. The control system is also operable, after the initiating, to generate current fluctuations to vary a rate of change of current through the coil. The control system is also operable to estimate a position of the armature based on the rate of change of current through the coil.

In certain embodiments, another general aspect includes a computer-program product including a non-transitory computer-usable medium having computer-readable program code embodied therein. The computer-readable program code is adapted to be executed to implement a method of controlling a solenoid including an armature and a coil. The method includes initiating movement of the armature by applying a first commanded electrical current to the coil. The method also includes, after the initiating, generating current fluctuations to vary a rate of change of current through the coil. The method also includes estimating a position of the armature based on the rate of change of current through the coil.

BRIEF DESCRIPTION OF THE DRAWINGS

FIG. 4 illustrates an example of a process for controlling a solenoid based on armature positions estimated from inductance values, in accordance with certain embodiments of the present disclosure.

DETAILED DESCRIPTION

Solenoids are commonly used for actuation in various systems, such as, for example, engagement and disengagement of a drive unit disconnect system. In many applications, actuation involves monitoring a position of a solenoid armature. Typically, a dedicated position sensor is utilized for this purpose. A hall-effect position sensor, for example, may detect changes in magnetic field around a solenoid coil and translate these changes into changes in armature position. Although dedicated position sensors can be useful for monitoring the position of a solenoid armature, such sensors add complexity to circuitry as well as material cost. In addition, dedicated position sensors typically require additional time and resources, for example, to perform sensor calibration. Further, the existence of a dedicated position sensor can represent a possible point of failure.

In various embodiments of the present disclosure, a control system can operate a solenoid without a dedicated position sensor, such as a hall-effect sensor. For example, the control system can initiate movement of an armature of the solenoid by applying a commanded electrical current to a coil of the solenoid. Thereafter, the control system can generate current fluctuations to vary (e.g., increase a magnitude of) a rate of change of current through the coil, for example, by adjusting a duty cycle or applying alternating current (AC) voltage. The control system can estimate a position of the armature based on the rate of change of current though the coil.

The control system can estimate the position of the armature in various ways. For example, in some implementations, the control system can determine a solenoid inductance based on the rate of change of current through the coil. The control system can then predict the position of the armature based on a known relationship between inductance values and armature positions. In another example, in some implementations, the control system can predict the position of the armature directly from the rate of change of current through the coil, for example, based on a known relationship between rates of change of current and armature positions. These and other embodiments are described below in further detail in conjunction with FIGS. 1A, 1B, and 2-5.

Figure 1A:
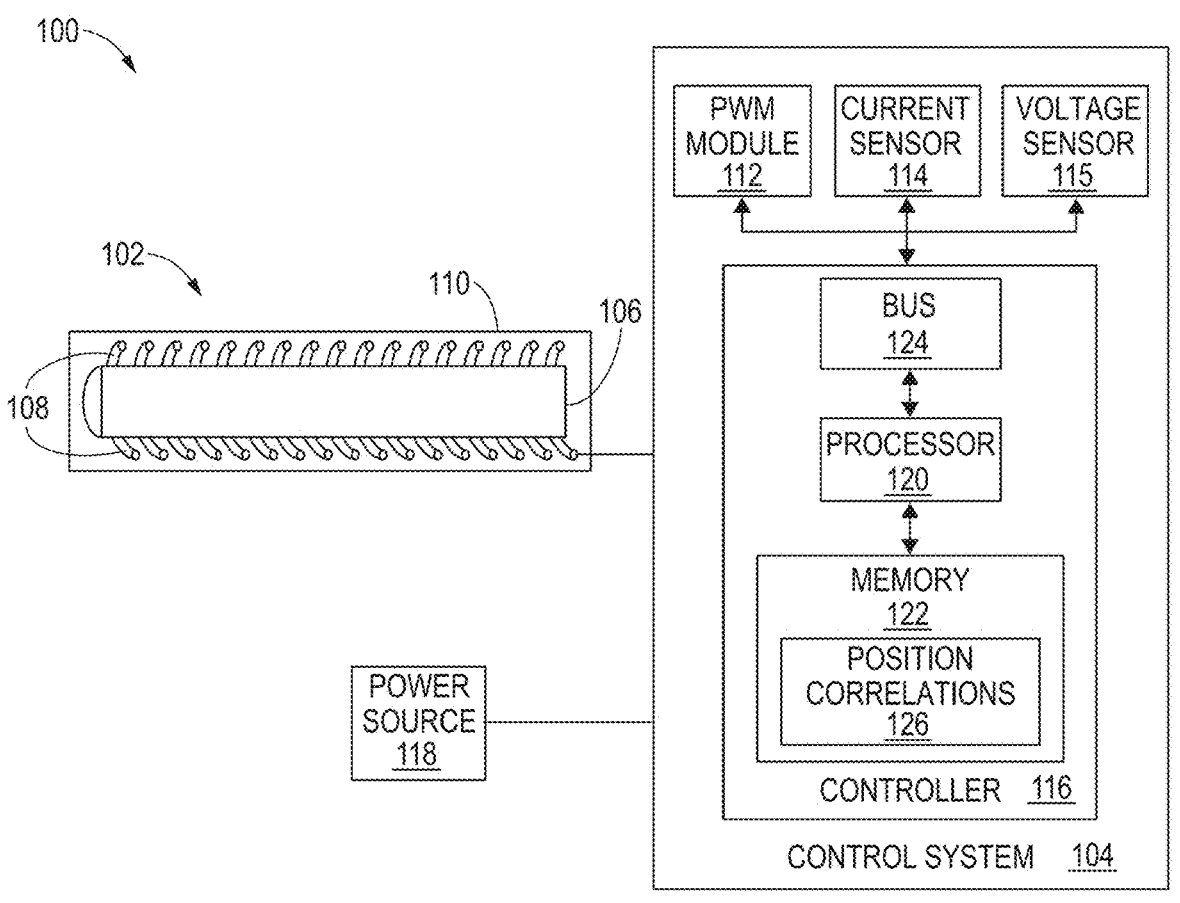
FIG. 1A illustrates an example of a solenoid-based actuation system, in accordance with certain embodiments of the present disclosure.

FIG. 1A illustrates an example of a solenoid-based actuation system 100, in accordance with certain embodiments of the present disclosure. As shown in FIG. 1A, the solenoid-based actuation system 100 includes a solenoid 102, a control system 104, and a power source 118, such as a battery, that supplies power to the control system 104 and/or components thereof. The solenoid 102 is shown as a cross-sectional view and includes an armature 106 and a coil 108 within a housing 110. The coil 108 can be, for example, a length of wire around the armature 106.

Figure 1B:
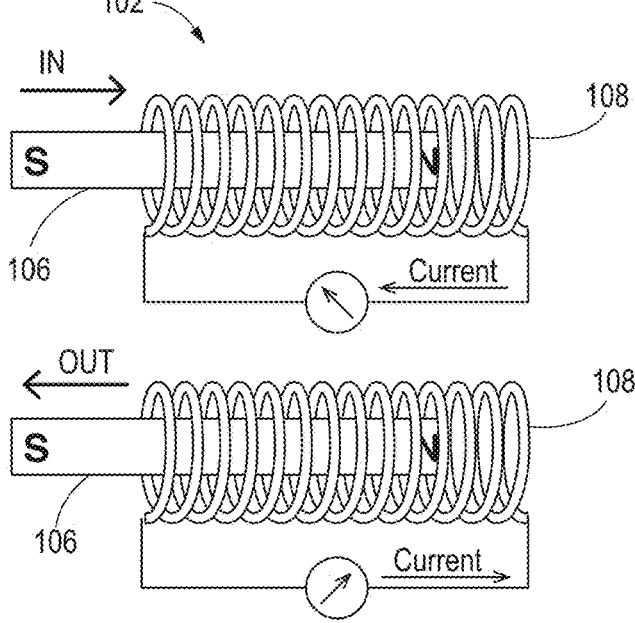
FIG. 1B illustrates perspective views of a solenoid, with a housing omitted for clarity, in accordance with certain embodiments of the present disclosure.

FIG. 1B illustrates perspective views of the solenoid 102, with the housing 110 omitted for clarity, in accordance with certain embodiments of the present disclosure. With reference to FIGS. 1A-B collectively, the armature 106 can include, for example, a movable core (e.g., made of steel or iron) that is caused to move by an electromagnetic field generated by the coil 108. The coil 108 can be shaped such that the armature 106 moves in and out of a space in a center thereof, thereby altering the inductance of coil 108. The movement of the armature 106 can provide a mechanical force to a suitable mechanism, such as a valve, a drive unit disconnect system, and/or any other component (e.g., of a vehicle).

The solenoid 102 can be controlled by the control system 104. The control system 104 is in electrical communication with the coil 108 and can include, for example, a pulse width modulation (PWM) module 112, a current sensor 114, a voltage sensor 115, and a controller 116. For simplicity, FIG. 1A illustrates a single electrical connection between the control system 104 and the solenoid 102 (i.e., between the control system 104 and the coil 108). However, it should be appreciated that, in various embodiments, this connection can include any suitable circuitry and/or corresponding electrical connections between the control system 104 and the solenoid 102 and/or any components thereof. For example, in some embodiments, the PWM module 112, the current sensor 114, and/or the voltage sensor 115 can each include one or more separate electrical connections to perform their respective functions.

The PWM module 112 can provide a control signal to the coil 108, for example, as commanded by the controller 116. The control signal can regulate a flow of current through the coil 108 and, in turn, control the magnitude of the generated magnetic field. In certain embodiments, frequency and duty cycle relative to the control signal establishes a resulting average current through the coil 108, which in turn controls the force applied to armature 106. In general, the current flowing through the coil 108 is directly proportional to the generated magnetic field, and the generated magnetic field exerts force on the armature 106 to cause the armature 106 to move to a desired position. With particular reference to FIG. 1B, in general, the higher the duty cycle, the higher the average current flow through the coil 108 and the further the armature 106 moves in a configured direction, such as "outward." Conversely, a lower duty cycle drives less average current flow through the coil 108, which results in the armature 106 moving in the opposite direction, such as "inward."

The current sensor 114 measures current through the coil 108. The current sensor 114 can measure the current through the coil 108 in any suitable fashion, such as measuring current between a high-side switch and the coil 108. The voltage sensor 115 can measure, for example, voltage (e.g., voltage drop) across the coil 108. In certain embodiments, the current sensor 114 and the voltage sensor 115 are operable to provide the measured current and the measured voltage, respectively, to the controller 116.

The controller 116 can include, for example, a processor 120 coupled to memory 122 and bus 124. In certain embodiments, the controller 116 can include one or more system-on-chips (SOCs). Each SOC may include a number of multi-core processors coupled to a high-speed interconnect and on-chip memory, and may perform a wide array of functions. In some embodiments, the controller 116 can be an electronic control unit.

The memory 122 can include, for example, position correlations 126 stored therein. In various embodiments, the position correlations 126 can include stored information related to a correlation of positions of the armature 106 to other information available to the controller 116, as further discussed below. In some embodiments, the position correlations 126 can include, for example, stored correlations of the armature 106 to such other information available to the controller 116. In addition, or alternatively, the position correlations 126 can include one or more models (e.g., machine learning models) configured to provide or predict a position of the armature 106 given such other information as input. In various embodiments, the position correlations 126 can be preset, calibrated, and/or trained for different types of actuation systems.

In various embodiments, the controller 116 can estimate a position of the armature 106 using a feedback loop that includes the controller 116, the PWM module 112, the current sensor 114, and the voltage sensor 115. For example, the controller 116 can cause the PWM module 112, via the control signal to the coil 108, to generate current fluctuations to vary (e.g., increase a magnitude of) a rate of change of current through the coil 108. In conjunction therewith, the controller 116 can continuously (e.g., periodically) receive, from the current sensor 114, measurements of current through the coil 108. Based on the received measurements, the controller 116 can measure a rate of change of current through the coil 108. In various embodiments, the controller 116 can cause the PWM module 112 to generate current fluctuations, for example, until a magnitude of the rate of change satisfies a configurable threshold and/or other criteria. The position of the armature 106 can then be estimated based on the rate of change of current through the coil 108.

In some embodiments, the controller 116 can estimate the position of the armature 106 using an inductance or other computation based on the rate of change. For example, the controller 116 can compute an inductance (L) according to Equation 1 below, where v corresponds to induced voltage (e.g., measured by the voltage sensor 115) and di/dt corresponds to the rate of change (e.g., computed from measurements from the current sensor 114, as discussed above). In such embodiments, the position correlations 126 can include, for example, information related to a correlation of inductance values to armature positions, where the different armature positions can represent a change (e.g., in mm) relative to an initial or starting position. In some embodiments, the position correlations 126 can include, for example, stored correlations of inductance values to armature positions, such that the inductance (L) can be matched or correlated to the position correlations 126 to predict the armature position. In addition, or alternatively, the position correlations 126 can include one or more models (e.g., machine learning models) configured to provide or predict a position of the armature 106 given the inductance (L) as input. For illustrative purposes, an example of the position correlations 126 including correlations of inductance values to armature positions is described below in conjunction with FIG. 2. An example of estimating the position of the armature 106 based on inductance values is described below in conjunction with FIG. 4.

$$L = \frac{v}{di/dt} \qquad \text{Equation 1}$$

In some embodiments, the controller 116 can estimate the position of the armature 106 directly from the rate of change of current through the coil 108. In such embodiments, the position correlations 126 can include, for example, information related to a correlation of rates of change of current to armature positions, where the different armature positions can represent a change (e.g., in mm) relative to an initial or starting position. In some embodiments, the position correlations 126 can include, for example, stored correlations of rates of change of current to armature positions, such that the rate of change of current through the coil 108 can be matched or correlated to the position correlations 126 to predict the position of the armature 106. In addition, or alternatively, the position correlations 126 can include one or more models (e.g., machine learning models) configured to provide or predict a position of the armature 106 given the rate of change of current as input. An example of estimating the position of the armature 106 directly from the rate of change of current through the coil 108 is described below in conjunction with FIG. 5.

Figure 2:
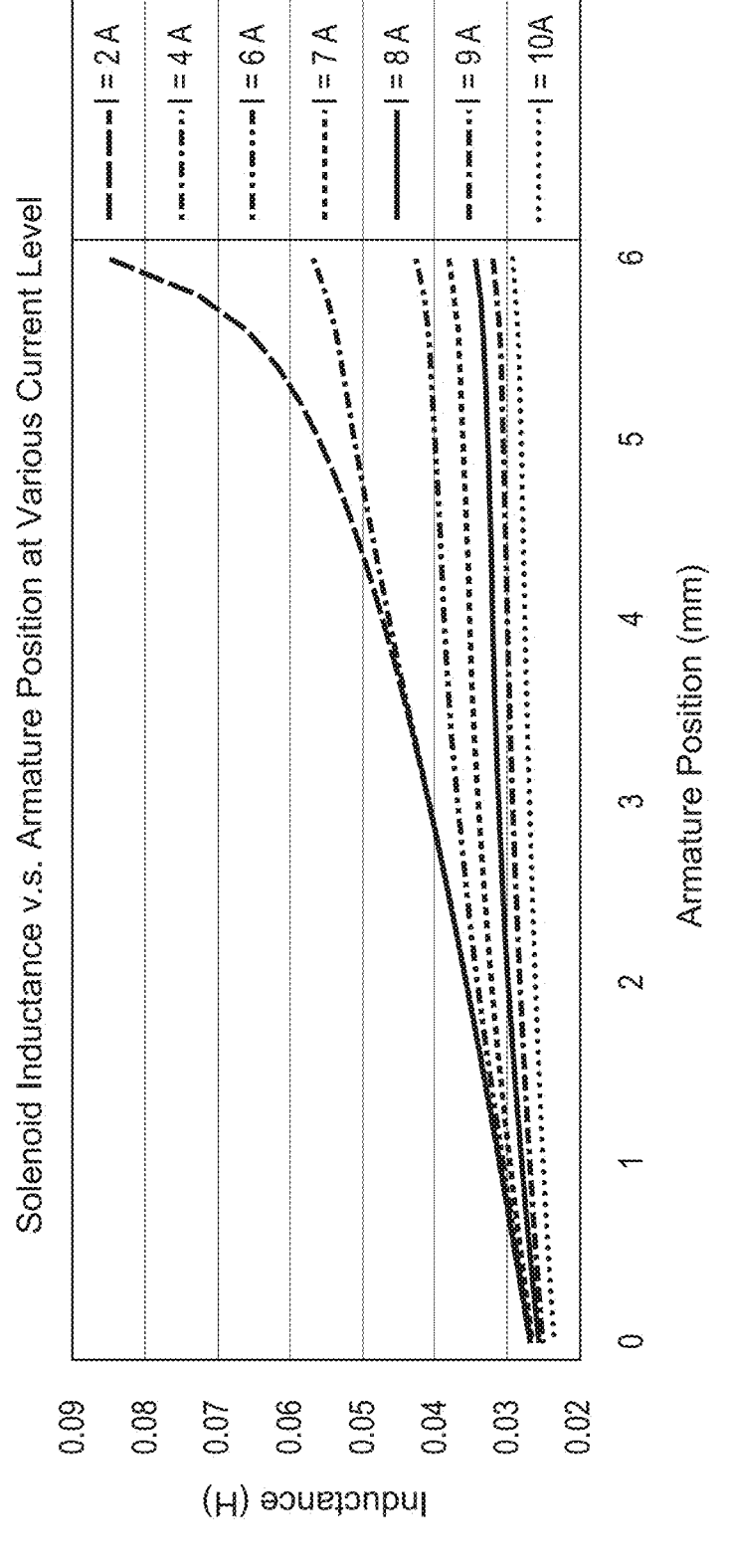
FIG. 2 illustrates an example of armature positions as a function of inductance, in accordance with certain embodiments of the present disclosure.

FIG. 2 illustrates an example of position correlations 226, in accordance with certain embodiments of the present disclosure. As shown in FIG. 2, the position correlations 226 correlate inductance values to armature positions at different current levels. In various embodiments, the position correlations 226 can serve, for example, as all or part of the position correlations 126 of FIG. 1A. In the illustration of FIG. 2, the position correlations 226 indicate that lower current levels (e.g., 2 A) in combination with greater inductance values (e.g., 0.05 or higher) result in the greatest amount of change in armature position.

Figure 3:
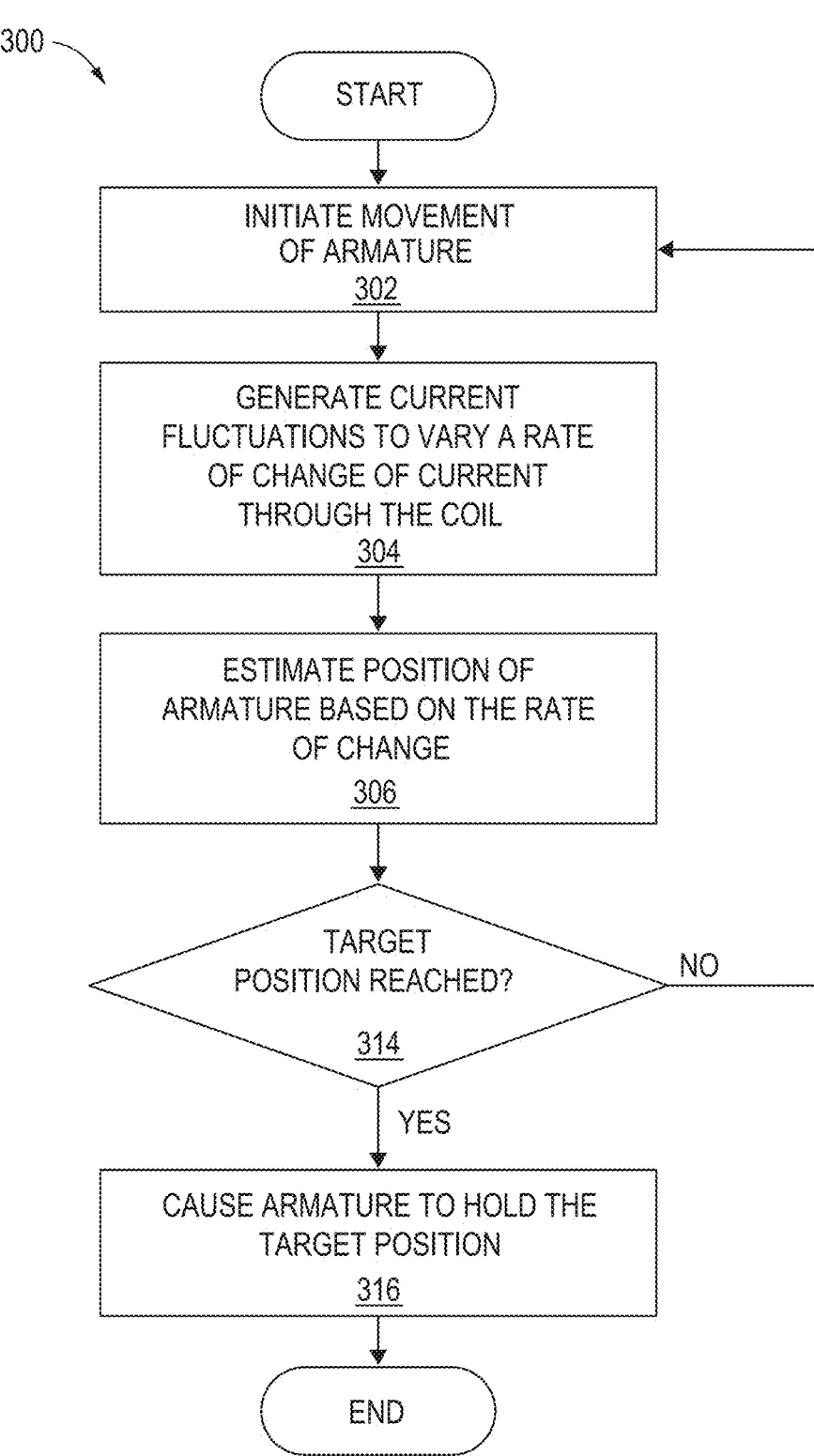
FIG. 3 illustrates an example of a process for controlling a solenoid, in accordance with certain embodiments of the present disclosure.

FIG. 3 illustrates an example of a process 300 for controlling a solenoid, in accordance with certain embodiments of the present disclosure. In various embodiments, the process 300 can be executed by any component operable to communicate with a solenoid. For illustrative purposes, the process 300 will be described generically relative to the solenoid-based actuation system 100 of FIGS. 1A-B.

At block 302, the control system 104 initiates movement of the armature 106, for example, toward a target position, by applying a commanded electrical current to the coil 108. In some embodiments, the target position can be set at a beginning of the process 300. In addition, or alternatively, in some embodiments, the target position can change during the process 300 (e.g., based on user or system feedback). The commanded electrical current can be, for example, a predefined value associated with initial movement of the armature 106 (e.g., 10A or another suitable value). The predefined value can depend on the physical scale of the armature 106. In some embodiments, the commanded electrical current can be determined by calculating the amount of force needed to initiate armature movement and then mapping the amount of force to a current value. In various embodiments, the commanded electrical current can be applied, for example, via the control signal from the PWM module 112.

At block 304, the control system 104 generates current fluctuations to vary a rate of change of current through the coil 108. In certain embodiments, the current fluctuations are generated to increase a magnitude of the rate of change through the coil. The current fluctuations can be generated, for example, by adjusting a duty cycle associated with the coil 108, by applying AC voltage to the coil 108, and/or via another method. In various embodiments, the current fluctuations can be generated via the control signal from the PWM module 112. Examples of generating the current fluctuations will be described in greater detail relative to FIGS. 4 and 5.

At block 306, the control system 104 estimates a position of the armature 106 based on the rate of change of current through the coil 108. As discussed relative to FIGS. 1A-B, the position can be estimated, for example, based on an inductance computation, directly from the rate of change of current through the coil, or via another method. An example of estimating the position of the armature 106 based on an inductance computation will be described relative to FIG. 4. An example of estimating the position of the armature 106 directly from the rate of change of current through the coil 108 will be described relative to FIG. 5.

At decision block 314, the control system 104 determines, based on the estimated position, whether a target position (e.g., a current target position) of the armature 106 has been reached. If not, the process 300 returns to the block 302 and executes as described previously. Otherwise, if the control system 104 determines, at the decision block 314, that the target position of the armature 106 has been reached, the process 300 proceeds to block 316. At block 316, the control system 104 causes the armature 106 to hold the target position, for example, by applying a corresponding commanded electrical current to the coil 108. The commanded electrical current can be, for example, a predefined value associated with holding the position of the armature 106 (e.g., less than 10 A or another suitable value). The predefined value can depend on the physical scale of the solenoid 102. In some embodiments, the commanded electrical current can be determined by calculating the amount of force needed to counter a spring force associated with the solenoid 102 and then mapping the amount of force value to a current value. After block 316, the process 300 ends.

FIG. 4 illustrates an example of a process 400 for controlling a solenoid based on armature positions estimated from inductance values, in accordance with certain embodiments of the present disclosure. In various embodiments, the process 400 can be performed as all or part of the process 300 of FIG. 3. Although the process 400 can be executed by any component operable to communicate with a solenoid, for illustrative purposes, the process 400 will be described relative to the solenoid-based actuation system 100 of FIGS. 1A-B.

At block 402, the control system 104 initiates movement of the armature 106, for example, toward a target position, by applying a commanded electrical current to the coil 108, in similar fashion to the block 302 of FIG. 3. The commanded electrical current can be, for example, a predefined value associated with initial movement of the armature 106. In various embodiments, the commanded electrical current can be applied, for example, via the control signal from the PWM module 112.

In general, blocks 404-408 of the process 400 relate to an example of generating current fluctuations to vary (e.g., increase a magnitude of) a rate of change of current through the coil 108, for example, as described relative to block 304 of FIG. 3. At block 404, the control system 104 adjusts a duty cycle (e.g., by dithering the duty cycle) associated with the coil 108. For example, the control system 104 can incrementally increase or decrease a duty cycle associated with the coil 108. In various embodiments, the duty cycle can be adjusted, for example, via the control signal from the PWM module 112. In some embodiments, the adjustment at the block 404 can be different in each subsequent iteration, for example, based on a difference between a measured current rate of and a minimum acceptable rate of change (see blocks 406 and 408 below). In this way, in certain embodiments, the control system 104 can implement closed-loop control of the duty cycle.

At block 406, the control system 104 measures a rate of change of current through the coil 108 following the adjustment to the duty cycle, for example, as discussed relative to FIGS. 1A-B. At decision block 408, the control system 104 determines whether a magnitude of the rate of change of current through the coil 108 satisfies a minimum threshold for the rate of change (e.g., a predetermined minimum threshold), or other suitable criteria. In various embodiments, the minimum threshold corresponds to a rate of change that enables a position of the armature to be estimated with an acceptable accuracy (e.g., with noise below a threshold representative of expected noise in a current environment). If the minimum threshold, or other suitable criteria, is not satisfied, the process 400 returns to the block 404 for further adjustment of the duty cycle. Otherwise, if the magnitude of the rate of change satisfies the minimum threshold, the process 400 proceeds to block 410. In various embodiments, execution of blocks 404-408 can repeat until the magnitude of the rate of change of current through the coil 108 satisfies the minimum threshold, or other suitable criteria.

In general, blocks 410-412 relate to an example of estimating a position of the armature 106, as discussed relative to block 306 of FIG. 3. At block 410, the control system 104 determines a solenoid inductance based on the rate of change of current through the coil. The solenoid inductance can be determined, for example, as discussed relative to FIGS. 1A-B. At block 412, the control system 104 predicts a position of the armature 106 based on stored information related to a correlation of inductance values to armature positions, for example, within the position correlations 126 of FIG. 1A and/or the position correlations 226 of FIG. 2.

At decision block 414, the control system 104 determines, based on the estimated position, whether a target position (e.g., a current target position) of the armature 106 has been reached. If it is determined that the target position has not been reached, the process 400 returns to the block 402 and executes as described previously. Otherwise, if the control system 104 determines, at the decision block 414, that the target position of the armature 106 has been reached, the process 400 proceeds to block 416. At block 416, the control system 104 causes the armature 106 to hold the target position, for example, by applying corresponding commanded electrical current to the coil 108, as discussed relative to the block 316 of FIG. 3. After block 416, the process 400 ends.

Figure 5:
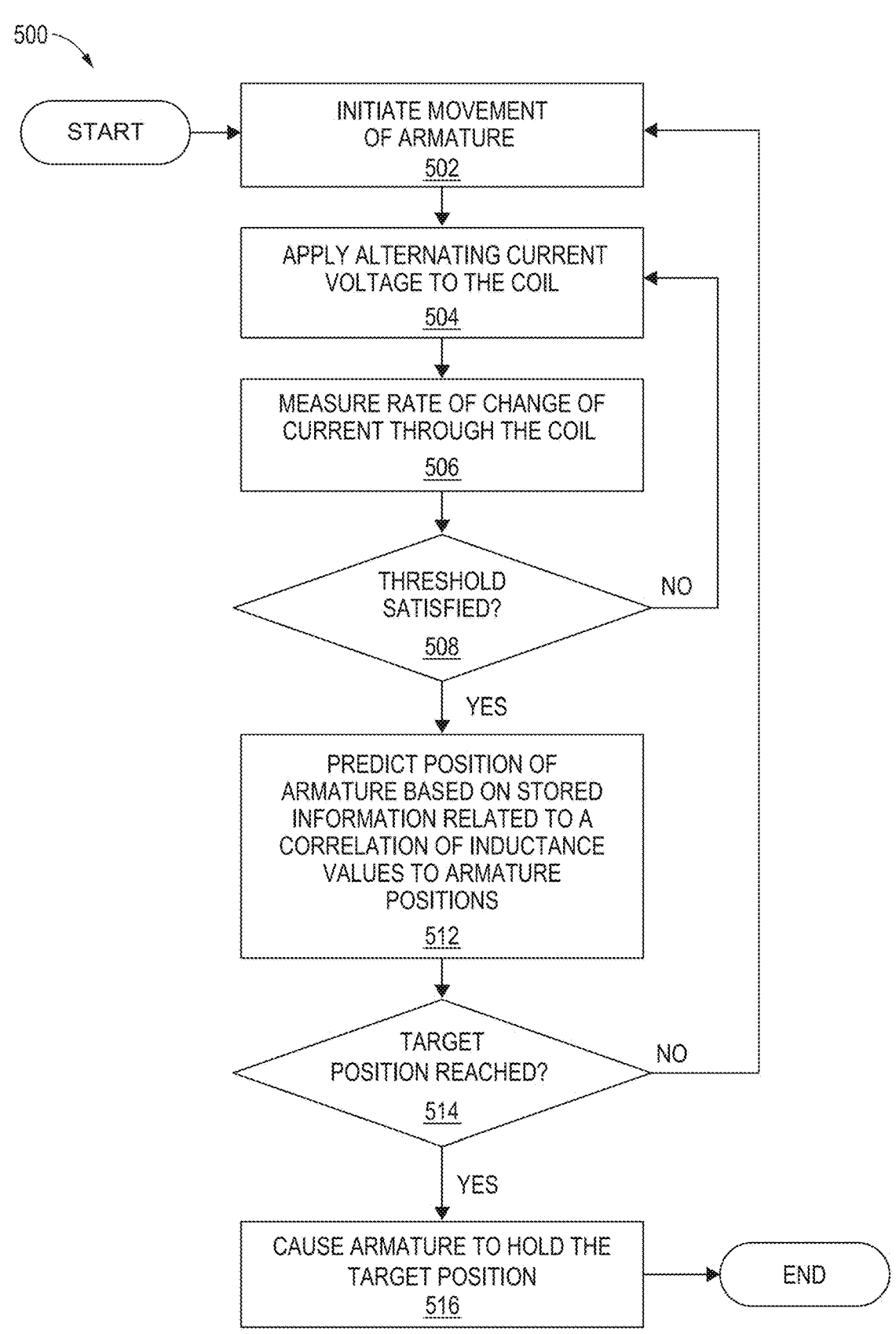
FIG. 5 illustrates an example of a process for controlling a solenoid based on armature positions estimated directly from a rate of change of current through a coil, in accordance with certain embodiments of the present disclosure.

FIG. 5 illustrates an example of a process 500 for controlling a solenoid based on armature positions estimated directly from a rate of change of current through a coil, in accordance with certain embodiments of the present disclosure. In various embodiments, the process 500 can be performed as all or part of the process 300 of FIG. 3. Although the process 500 can be executed by any component operable to communicate with a solenoid, for illustrative purposes, the process 500 will be described relative to the solenoid-based actuation system 100 of FIGS. 1A-B.

At block 502, the control system 104 initiates movement of the armature 106, for example, by applying a commanded electrical current to the coil 108, in similar fashion to the block 302 of FIG. 3. The commanded electrical current can be, for example, a predefined value associated with initial movement of the armature 106. In various embodiments, the commanded electrical current can be applied, for example, via the control signal from the PWM module 112.

In general, blocks 504-508 of the process 500 relate to an example of generating current fluctuations to vary (e.g., increase a magnitude of) a rate of change of current through the coil 108, for example, as described relative to block 304 of FIG. 3. At block 504, the control system 104 applies AC voltage to the coil 108. For example, the control system 104 can apply a predetermined incremental amount of AC voltage to the coil 108. In various embodiments, the AC voltage can be applied, for example, via the control signal from the PWM module 112. In various embodiments, the AC voltage is large enough to generate a rate of change in current that surpasses the highest level of expected noise (e.g., AC voltage equal to 5% of the power supply voltage, or another suitable value).

At block 506, the control system 104 measures a rate of change of current through the coil 108, for example, as discussed relative to FIGS. 1A-B. At decision block 508, the control system 104 determines whether a magnitude of the rate of change of current through the coil 108 satisfies a minimum threshold for rate of change (e.g., a predetermined minimum threshold) or other suitable criteria, for example, in similar fashion to the decision block 408 of FIG. 4. If the minimum threshold, or other suitable criteria, is not satisfied, the process 500 returns to the block 504 for further application of AC voltage. Otherwise, if the magnitude of the rate of change satisfies the minimum threshold, the process 500 proceeds to block 512. In various embodiments, execution of blocks 504-508 can repeat until the magnitude of the rate of change of current through the coil 108 satisfies the minimum threshold, or other suitable criteria.

At block 512, the control system 104 predicts a position of the armature 106 based on stored information related to a correlation of rates of change of current to armature positions, for example, within the position correlations 126 of FIG. 1A. In general, block 512 relates to an example of estimating a position of the armature 106, as discussed relative the block 306 of FIG. 3. At decision block 514, the control system 104 determines, based on the estimated position, whether a target position (e.g., a current target position) of the armature 106 has been reached. If it is determined that the target position has not been reached, the process 500 returns to the block 502 and executes as described previously. Otherwise, if the control system 104 determines, at the decision block 514, that the target position of the armature 106 has been reached, the process 500 proceeds to block 516. At block 516, the control system 104 causes the armature 106 to hold the target position, for example, by applying corresponding commanded electrical current to the coil 108, as discussed relative to the block 316 of FIG. 3. After block 516, the process 500 ends.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method of controlling a solenoid including an armature and a coil, the method comprising:
   initiating, by a control system in electrical communication with the coil, movement of the armature by applying a first commanded electrical current to the coil;
   after the initiating, generating, by the control system, current fluctuations to vary a rate of change of current through the coil; and
   estimating, by the control system, a position of the armature based on the rate of change of current through the coil.

2. The method of claim 1, wherein the generating comprises adjusting a duty cycle associated with the coil until a magnitude of the rate of change of current through the coil satisfies a threshold.

3. The method of claim 1, wherein the generating comprises applying alternating current (AC) voltage to the coil until a magnitude of the rate of change of current through the coil satisfies a threshold.

4. The method of claim 1, wherein the generated current fluctuations increase a magnitude of the rate of change of current through the coil.

5. The method of claim 1, wherein the estimating comprises:

determining a solenoid inductance based on the rate of change of current through the coil; and predicting the position of the armature based on stored information related to a correlation of inductance values to armature positions.

6. The method of claim 1, wherein the estimating comprises predicting the position of the armature based on stored information related to a correlation of rates of change of current to armature positions.

7. The method of claim 1, further comprising, responsive to a determination that the armature has reached a target position, causing, by the control system, the armature to hold the target position by applying a second commanded electrical current to the coil.

8. An actuation system comprising:

a solenoid comprising an armature and a coil;

a control system in electrical communication with the coil, wherein the control system is operable to:

initiate movement of the armature by applying a first commanded electrical current to the coil;

after the initiating, generate current fluctuations to vary a rate of change of current through the coil; and estimate a position of the armature based on the rate of change of current through the coil.

9. The actuation system of claim 8, wherein the generating comprises adjusting a duty cycle associated with the coil until a magnitude of the rate of change of current through the coil satisfies a threshold.

10. The actuation system of claim 8, wherein the generating comprises applying alternating current (AC) voltage to the coil until a magnitude of the rate of change of current through the coil satisfies a threshold.

11. The actuation system of claim 8, wherein the generated current fluctuations increase a magnitude of the rate of change of current through the coil.

12. The actuation system of claim 8, wherein the estimating comprises:

determining a solenoid inductance based on the rate of change of current through the coil; and predicting the position of the armature based on stored information related to a correlation of inductance values to armature positions.

13. The actuation system of claim 8, wherein the estimating comprises predicting the position of the armature based on stored information related to a correlation of rates of change of current to armature positions.

14. The actuation system of claim 8, further comprising, responsive to a determination that the armature has reached a target position, causing, by the control system, the armature to hold the target position by applying a second commanded electrical current to the coil.

15. A computer-program product comprising a non-transitory computer-usable medium having computer-readable program code embodied therein, the computer-readable program code adapted to be executed to implement a method of controlling a solenoid including an armature and a coil, the method comprising:

initiating movement of the armature by applying a first commanded electrical current to the coil;

after the initiating, generating current fluctuations to vary a rate of change of current through the coil; and estimating a position of the armature based on the rate of change of current through the coil.

16. The computer-program product of claim 15, wherein the generating comprises adjusting a duty cycle associated with the coil until a magnitude of the rate of change of current through the coil satisfies a threshold.

17. The computer-program product of claim 15, wherein the generating comprises applying alternating current (AC) voltage to the coil until a magnitude of the rate of change of current through the coil satisfies a threshold.

18. The computer-program product of claim 15, wherein the generated current fluctuations increase a magnitude of the rate of change of current through the coil.

19. The computer-program product of claim 15, wherein the estimating comprises:

determining a solenoid inductance based on the rate of change of current through the coil; and predicting the position of the armature based on stored information related to a correlation of inductance values to armature positions.

20. The computer-program product of claim 15, wherein the estimating comprises predicting the position of the armature based on stored information related to a correlation of rates of change of current to armature positions.

* * * * *